Dec. 5, 1939.   W. B. ELMER   2,182,048
ELECTRIC HEAT CONTROLLER
Filed Feb. 23, 1937
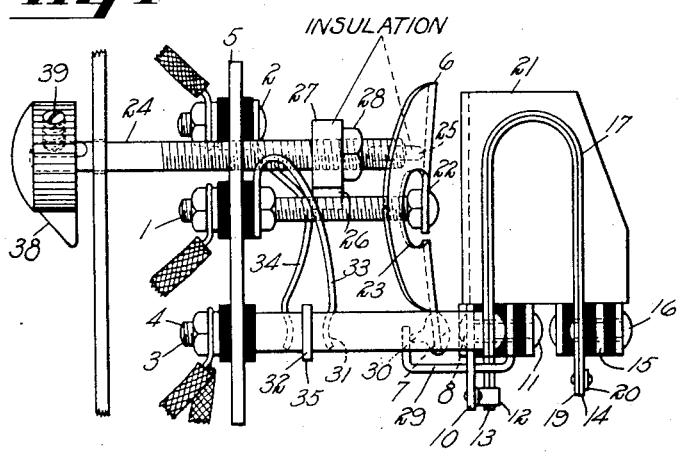
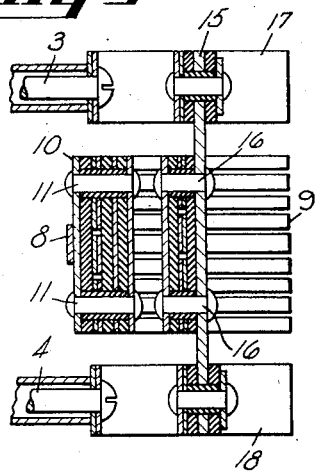
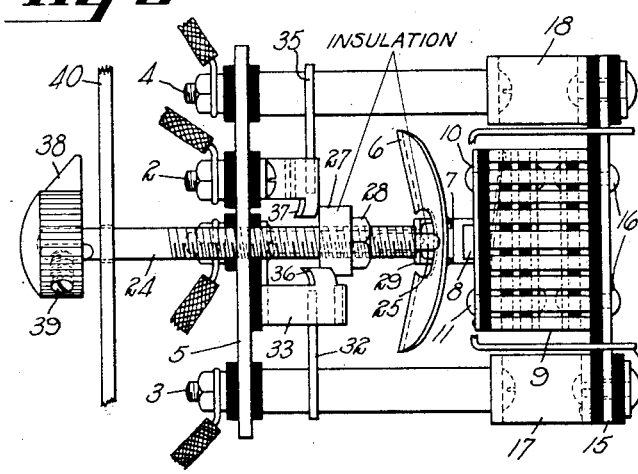
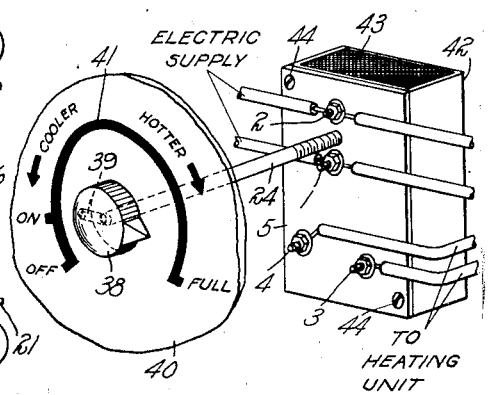
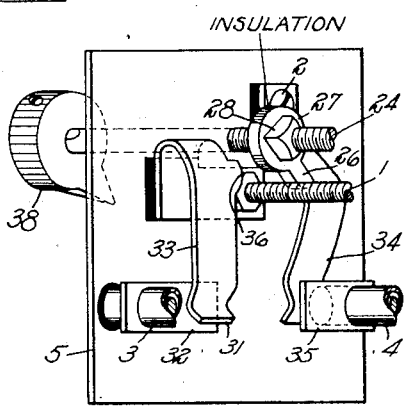
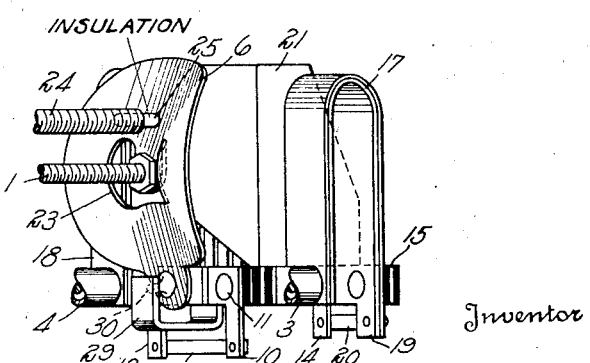
Inventor
WILLIAM B. ELMER
By T. Clay Lindsey
Attorneys Patented Dec. 5, 1939

2,182,048

UNITED STATES PATENT OFFICE 2,182,048

ELECTRIC HEAT CONTROLLER

William B. Elmer, Winchester, Mass.

Application February 23, 1937, Serial No. 127,060

24 Claims. (Cl. 200—113)

The present invention relates to a thermostatic controlling device and more particularly to a thermostatic controlling device adapted to control the flow of current by intermittently opening and closing a circuit.

An object of the present invention is the provision of a thermostatic controlling device which is particularly adapted for use with electrical heating elements of the exposed or surface type such as are commonly used in domestic electric ranges. It has been common practice to control such open type elements by the use of switches which connect the electrical supply voltages to the electrical resistance elements in various combinations to obtain different degrees of heat, and, as generally provided, there have been but three predetermined settings—namely, "low", "medium", and "high", thus greatly limiting the flexibility of the heating elements. It has also been the practice to use thermostatic temperature-responsive control elements for maintaining the heating devices at a predetermined temperature; these devices acting to open the circuit when a predetermined temperature has been reached and to close it when the temperature has fallen below the desired temperature.

It is an object of the present invention to overcome the use of such switches and temperature control devices and to afford a range of control for the heating element whereby it may be used from a very small fraction of the heating capacity thereof to the maximum capacity thereof through the periodic interruption and reestablishment of the electrical current in predetermined time periods.

A still further object is a device wherein the time period of current flow is controlled by varying the relative positions of the contacts of an intermittently operating switch element to obtain a net effect wherein the average rate of heat production by the controlled heating unit over a long period of time amounts to a definite fraction of the normal full rating of the unit and thus operates to substantially maintain a constant temperature at some desired point.

It is a further object of the invention to provide a control device of the snap acting type which is adapted to be moved from one stable position to another by the relative movements of a thermostatic element responsive to current flow, and providing means for varying the curvature of said snap acting member to thereby adjust the ratio of time during which said contacts are closed and the time during which said contacts are opened in each cycle of contact operation.

A still further object is a device wherein there is associated with the snap acting member a double pole control in series therewith, whereby the snap acting member may be short-circuited upon the reaching of maximum capacity of the device, or the device may be immediately set for maximum capacity; and the further provision of a single control means for adjusting and varying the setting of the snap acting member and controlling the double pole switch elements.

A still further object is a controller of the aforementioned type, which is positive in its operation, utilizes a minimum number of parts, is of sturdy construction, and is both simple and economical to manufacture.

Other objects will be in part obvious and in part pointed out more in detail hereinafter.

The invention accordingly consists in the features of construction, combination of elements, and arrangement of parts which will be exemplified in the construction hereafter set forth and the scope of the applications of which will be indicated in the appended claims.

In the accompanying drawing:

Figure 1 is a side view of one embodiment of the invention herein;

Fig. 2 is a top view of the embodiment illustrated in Fig. 1;

Fig. 3 is a fragmentary detail view of the thermo-responsive motor element of the embodiment illustrated in Figs. 1 and 2;

Fig. 4 is a perspective view of the handle means looking in one direction; Fig. 4a is a perspective view of the thermally responsive means looking in another direction; and Fig. 5 is a view showing the device in assembled position relative to the operating panel of an electric range.

Referring to the drawing, the embodiment illustrated comprises a front plate 5 on which there is mounted, but insulated therefrom, a pair of parallel posts 3 and 4, which project forwardly of the panel and serve as terminals for the electrical connections to a heating unit, and they project inwardly therefrom to respectively support and electrically connect to one leg of the composite, inverted U-shaped, bi-metallic strips 17 and 18. The rear legs of the composite members 17 and 18 are interconnected by, but insulated from, a strip 15, which strip 15 provides a relatively fixed support for a bimetallic thermostatic responsive motor element 9 adapted to expand and contract in response to current flow. In the embodiment illustrated, the element 9 is also in the shape of an inverted U with the rear leg thereof secured to, but insulated from the strip 15 by the rivets 16; whereas the forward leg is free to float forwardly and rearwardly upon changes of temperature in the thermostatic motor element 9.

The compensating strips 17 and 18 are equivalent in thermostatic action to the motor element 9 and serve to compensate for variations due to ambient temperatures, and thus the floating leg of motor element 9 will always be in the same relative position to the supporting posts 3 and 4 when it is not acting in response to current flow. The motor element 9 consists of a wide strip of suitable conducting material subdivided lengthwise, without affecting its stiffness and deflectivity, into a grid, having a plurality of narrow bars alternately joined at their opposite ends to form a tortuous path of greater electrical resistance to the heating current than would be offered without said subdivisions. The form of element shown and manner of supporting same is preferred, as the dissipated heat thereof may most readily be carried off, though any suitable element may be used.

The fixed leg of the motor element 9 has a downwardly depending finger 14 which is electrically connected through a thin copper strip 20 to a depending finger 19 of the compensating strip 17. The relatively small amount of electrical resistance in member 17, compared with motor element 9, will be insufficient to affect its compensating for ambient temperatures; it being obvious that an electrical connection could be made direct from finger 14 to post 3. The forward floating leg of the motor element 9 has a depending finger 13 electrically connected through a copper strip 12 to the depending finger of a plate 10 which is carried by, but insulated from, the floating end of the motor element 9 and in turn carries a contact 8. There is also carried by, but insulated from, the free end of the motor element 9 a U-shaped abutment member 29 having its forward leg in alignment with, but spaced forwardly from, the contact 8, whereupon as the free end of the motor element 9 floats forwardly and rearwardly it carries therewith the contact 8 and U-shaped member 29 which, being fixed relative to one another, maintain a set distance therebetween.

Positioned forwardly of the motor element 9 is a snap acting member 6 which carries, adjacent its lower edge, an electrical contact 7 having a back spacer 30; which contact and spacer are positioned intermediate of the forward leg of the U-shaped member 29 and the contact member 8 of motor element 9, with the spacer 30 abutting the forward leg of the member 29 when contacts 7 and 8 are open. The snap spring element 6 may be of the type shown and described in the copending application of the same inventor, Serial No. 126,018, filed February 16, 1937. It is sufficient here to point out that the snapping or flexible spring element 6 has a plurality of inherent curvatures about different axes and is adapted to snap from one position of stability to another, and, as illustrated, is provided with a substantially central aperture into which depends a supporting tongue 22; the tongue 22 being received on the inner end of a post 1 to which it is secured and relatively fixed in any suitable manner, thereby providing a fixed center about which the snap spring may be flexed.

There is further provided means for varying the inherent curvature of the snap acting spring relative to its support on post 1. In the embodiment illustrated, this means comprises a shaft 24 rotatably mounted in the plate 5 and having its outer end extending through a panel 40, such as is found in domestic electric ranges, and its inner end provided with an abutment 25 of suitable insulating material. The member 24 is so supported that the abutment 25 is offset from the center of snap acting element 6, and upon rotation of the shaft 24 the abutment 25 varies the strain upon the spring 6, thereby flexing it relative to its fixed center and changing the inherent curvature thereof, whereby the point at which it will flex from one position of stability to another is varied; thereby adjusting the ratio of time during which said contacts 7 and 8 are closed to the time during which said contacts are open in each cycle of operation.

The outer end of support 1 for snap member 6 is electrically connected to the source of power, and, when the spring element 6 is flexed to a position of stability where contacts 7 and 8 are closed, the current will flow from post 1 through spring 6 and through the closed contacts 7 and 8 to the motor element 9 and then through compensating strip 17 and post 3 to the heating element lead. The circuit from the heating element is completed through post 4 which is provided with an inwardly projecting member 35 adapted to be engaged by the auxiliary contact at the lower end of arm 34, which arm is supported at its upper end by the inner end of post 2, the post 2 being supported on, but insulated from, the plate 5 and having its outer end connected to the source of power.

The operation of the switch arm 34 is also controlled through shaft 24 which carries thereon a disk 27 of suitable insulating material which is secured thereto by a lock nut 28; the disk having a projecting arm 26 adapted to engage an inwardly projecting ear 37 of contact arm 34 and move it to open position, the ear 37 tending to exert a pressure on arm 26 to hold same at its limit of travel and serving to secure the member 24 in said position. The outer end of shaft 24 also carries a control knob 38 secured thereto by a screw 39 to permit ready manual manipulation of same. The knob is provided with a pointer which cooperates with the indicia 41 on front panel 40 to give visual indication of the setting of the controller. When the knob pointer is aligned with the "off" position 41 indicated on panel 40, the arm 26 will engage and hold switch arm 34 in open position, and abutment 25 will so bear against spring 6 that it is in the position shown in Fig. 2 with contacts 7 and 8 open and spaced apart approximately twenty-thousandths of an inch, which spacing has been found desirable if the device is to be used on A. C. current. Upon rotation of the shaft 24 to "on" position, the arm 26 will initially allow the closing of switch arm 34 to complete one connection to the heating element, and abutment 25 will then place the spring 6 under sufficient strain to cause it to snap over dead center from one position of stability to another and close the contacts 7 and 8 and thus complete the other connection to the heating element.

As the motor element 9 becomes heated due to the current flow therethrough, the free end thereof will move forwardly with contacts 7 and 8 in wiping engagement until spring 6 is again flexed over dead center and into engagement with abutment 29. The circuit will then remain broken until the motor element 9 cools and abutment 29 is carried rearwardly to a point where spring 6 again flexes to close contact 7.

The periodic time intervals between the opening and closing of the contacts 7 and 8 may be infinitely varied by further rotation of the knob 39 to cause abutment 25 to increase its strain against spring 6, and as the rotation is increased clockwise the contacts 7 and 8 remain closed for a few additional moments while element 9 deflects to meet the new dead center position of snapping spring 6, at which time the cycle of operations is resumed, with the period of current flow in the cycle of operation slightly increased due to the elevated temperature of grid 9. This results in a net greater amount of heat dissipation in the control heating element and a shorter total time cycle of operation. When the screw is advanced to substantially mid-point between "on" and "off", the cycles are shortest in overall time, whereas when it is advanced beyond the center position, the operating cycles again increase in total duration with the "on" portions of the cycle becoming longer and the "off" portions shorter until a point is reached where continuous flow of current in grid 9 is unable to deflect snapping spring 6 over dead center. There is thus provided a substantially complete range of control with an infinite number of positions over the rate of heat production in the controlled heating unit.

In order to prevent heat loss through the motor element 9 when it has reached capacity load, there is further provided a second auxiliary contact having a resilient switch arm 33 which is electrically connected to the post 1 at its upper end and has its lower end positioned to engage a member 32 projecting inwardly from post 3. The switch arm 33 is also controlled by arm 26 of the control shaft 24; the arm 26 being adapted to engage and close same when the maximum capacity has been reached and thus short-circuit the motor element 9 and establishing a circuit from post 1 through arm 33 to post 3, then to the heating element, and from the heating element to post 4 and through switch arm 34 to the post 2. The switch arm 33 is also provided with an inwardly projecting ear 36 adapted to engage the arm 26 to hold same in set position. Obviously if it is desired to bring the heating unit to high heat in relatively short time, the arm 26 may be turned to full position, thus short-circuiting the grid and having the usual effect of a double pole switch device.

In order to obtain more efficient operation, there may be provided a shield 21 intermediate of the grid 9 and the compensating members 17 and 18 to prevent radiation of heat from the grid 9 affecting the compensating members 17 and 18. There may also be provided a casing 42 (see Fig. 5) secured to the front plate 5 by bolts 44 to prevent erratic operation due to irregular cooling by movements of air, and having top and bottom screens 43, whereby there will be a draft of air through the device to carry away the radiated heat. Thus the device may be compactly enclosed within a casing and provided with a manually controlled adjusting member 24 projecting outside of the casing and through a range panel for convenient manipulation.

Although the device has been shown as utilizing the auxiliary contact members 34 and 35 which are controlled through the common control shaft 24, the intermittently acting contacts 7 and 8 would be equally operative were such auxiliary contacts dispensed with.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In an adjustable periodic electric circuit controller, a snap acting member having a plurality of inherent curvatures about different axes and adapted to snap from one position of stability to another, a relatively fixed support for said member and about which it is adapted to be flexed, a thermostatic element responsive to current flow, a pair of contact members respectively associated with and adapted to be moved by said member and thermostatic element and arranged to be in contact when said member is in one position of stability and to be out of contact when said member is in another position of stability, interengaging means between said thermostatic element and member and through which said element moves said member to its several positions of stability, and means for varying the curvature of said member to thereby adjust the ratio of time during which said contacts are engaged and disengaged.

2. In an adjustable periodic electric circuit controller, a snap acting member having a plurality of inherent curvatures about different axes and adapted to snap from one position of stability to another, a relatively fixed support for said member about which it is adapted to be flexed, a contact carried by said member, a thermostatic element responsive to current flow, a contact carried by said thermostatic element and adapted to be engaged by said first-mentioned contact when said member is in one position of stability and to be out of engagement when said member is in another position of stability, interengaging means between said thermostatic element and member through which said element moves said member to its several positions of stability, and means for varying the curvature of said member to adjust the ratio of time during which said contacts are engaged and disengaged.

3. In an adjustable periodic electric circuit controller, a snap acting member having a plurality of inherent curvatures about different axes and adapted to snap from one position of stability to another, a relatively fixed support for said member and about which it is adapted to be flexed, a thermostatic element responsive to current flow, a compensating element responsive to ambient temperatures supporting said thermostatic element, a pair of contact members respectively associated with and adapted to be moved by said member and thermostatic element and arranged to be in contact when said member is in one position of stability and to be out of contact when said member is in another position of stability, interengaging means between said thermostatic element and member and through which said element moves said member to its several positions of stability, and means for varying the curvature of said member to thereby adjust the ratio of time during which said contacts are engaged and disengaged.

4. In an adjustable periodic electric circuit controller, a snap acting member having a plurality of inherent curvatures about different axes and adapted to snap from one position of stability to another, a relatively fixed support for said snap acting member about which it is adapted to be flexed, a thermostatic element responsive to current flow and having a relatively fixed end and a floating end, a pair of contact members respectively associated with and adapted to be moved by said snap acting member and thermostatic element and arranged to be in contact when said snap acting member is in one position of stability and to be out of contact when said snap acting member is in another position of stability, interengaging means between the floating end of said thermostatic element and snap acting member and through which said element moves said member to its several positions of stability, and means for varying the curvature of said snap acting member to thereby vary the position at which it may be moved from one position of stability to another.

5. In an adjustable periodic electric circuit controller, a snap acting member having a plurality of inherent curvatures about different axes and adapted to snap from one position of stability to another, a contact carried thereby, a relatively fixed support for said snap acting member and about which it is adapted to be flexed, a thermostatic element responsive to current flow and having a relatively fixed end and a floating end, a contact carried by said floating end and adapted to be intermittently engaged and disengaged with said first contact, interengaging means between said thermostatic element and snap acting member through which said element moves said member to its several positions of stability, and means for varying the curvature of said member to thereby vary the periods of engagement and disengagement of said contacts.

6. In an adjustable periodic electric circuit controller, a snap acting member having a plurality of inherent curvatures about different axes and adapted to snap from one position of stability to another, a support about which said member is adapted to be flexed, a pair of contact members adapted to be intermittently opened and closed when said member is moved from one position of stability to another, a thermostatic control element responsive to current flow, interengaging means between said element and said member for moving it from one position of stability to another, and means for adjusting said snap acting member to vary the point at which said interengaging means will flex it from one position to another.

7. In an adjustable periodic electric circuit controller, a snap acting member having a plurality of inherent curvatures about different axes and adapted to snap from one position of stability to another, a relatively fixed support for said member about which it is adapted to be flexed, a thermostatic element responsive to current flow and having a relatively fixed end and a floating end, a support for the relatively fixed end of said element, comprising a compensating element responsive to ambient temperatures, a pair of contact members respectively associated with and adapted to be moved by said snap acting member and the floating end of said thermostatic element and arranged to be in contact when said member is in one position of stability and out of contact when said member is in another position of stability, interengaging means between said floating end of the thermostatic element and said member and through which said element moves said member to its several positions of stability, and means for varying the curvature of said member to thereby adjust the ratio of time during which said contacts are closed and the time during which said contacts are open in each cycle of contact operation.

8. In an adjustable periodic electric circuit controller, a snap acting member having a plurality of inherent curvatures about different axes and adapted to snap from one position of stability to another, said member having a centrally located aperture and a tongue depending in said aperture, a support for said member secured to said tongue, a contact carried by said member adjacent its lower edge, a thermostatic element responsive to current flow, a contact carried by said member and adapted to engage said first contact, inter-engaging means between said thermostatic element and member and through which said element moves said member to its several positions of stability to bring said contacts into and out of engagement, and abutting means offset from the support for said snap acting member for adjusting said member relative to the support to vary the curvature of said member and adjust the ratio of time during which said contacts are engaged and disengaged.

9. In an adjustable periodic electric circuit controller, a snap acting member, a support therefor about which said member is adapted to be flexed, a pair of contact members adapted to be opened and closed by flexing movements of said member, means for flexing said member, comprising a thermostatic element responsive to current flow, means carried by the thermostatic element and directly engaging said snap acting member, upon movement of said thermostatic member, to intermittently engage said contacts, and means for adjusting said snap acting member relative to said thermostatic element.

10. In an adjustable periodic electric circuit controller, a snap acting member, a support therefor about which said member is adapted to be flexed, a pair of contact members adapted to be opened and closed by flexing movements of said member, a thermostatic element responsive to current flow and having an end mounted relatively to the snap acting member and a floating end, interengaging means between the floating end and said snap acting member adapted, upon movement of said floating end, to flex said member, and means for adjusting said snap acting member relative to the floating end of said element.

11. In an adjustable periodic electric circuit controller, a snap acting member, a support for said member about which it is adapted to be flexed, manually operable abutment means offset from said support and adapted to flex said member relative to said support, a contact carried by the movable end of said member, a thermostatic element responsive to current flow, a contact carried by said element and adapted to engage said first contact, and interengaging means between said thermostatic element and said member for flexing said member about its support for moving said contacts into and out of engagement.

12. In an adjustable periodic electric circuit controller, a snap acting member, a support for said member about which it is adapted to be flexed, a thermostatic element responsive to current flow, a pair of contacts adapted to be moved into and out of engagement upon flexing of said member, one of said contacts being carried by said snap acting member and the other of said contacts being carried by said thermostatic element, interengaging means between said thermostatic element and said member for flexing said member about its support, and manually controlled means for varying the point at which said member may be flexed.

13. In an adjustable periodic electric circuit controller, a snap acting member, a support for said member about which it is adapted to be flexed, a pair of contacts adapted to be opened and closed upon flexing of said member, a thermostatic element responsive to current flow, a compensating element responsive to ambient temperatures and having a fixed end and a free end, means connecting one end of said thermostatic element to the free end of the compensating element, and interengaging means between the other end of said first thermo-responsive element and said member for flexing it about its support to intermittently open and close said contacts.

14. A thermostatic controller for an electric circuit, comprising an electrically heated thermostatic responsive member disposed to actuate electric contacts supplying the electric current to said circuit, said contacts being alternately closed and opened continuously by the action of the thermostatic member, and adjusting means to vary the ratio of time during which said contacts are closed and the time during which said contacts are open in each cycle of operation, and an auxiliary contact so disposed as to remove the heating current from the thermostatic member while adjusted to provide maximum heat.

15. A thermostatic controller for an electric circuit, comprising an electrically heated thermo-responsive member disposed to actuate electrical contacts supplying the electrical current to said circuit, said contacts being alternately closed and opened by the action of the thermo-responsive member, a normally opened auxiliary contact in series with said thermo-responsive member and adapted to be closed to complete said circuit, a second auxiliary contact adapted to remove the heating current from the thermo-responsive member when adjusted to provide maximum heat, and a common adjusting means for controlling said auxiliary contacts and to vary the ratio of time during which said alternately acting contacts are opened and closed.

16. A thermostatic controller for an electrical circuit, comprising a thermostatic member responsive to current flow, a pair of contacts adapted to be alternately opened and closed by said thermostatic member, a normally open auxiliary contact adapted when closed to complete the circuit through said contacts, and a second auxiliary contact adapted when closed to short-circuit said contacts and thermostatic member, and a common adjusting means for controlling said auxiliary contacts and to vary the time during which said intermittent contacts are opened and closed.

17. In a self-actuating periodic make and break electric circuit controller, means for adjusting said controller to operate in various predetermined time periods, an enclosing case, said adjusting means extending through said case, and terminating in manual adjusting means.

18. In a self-actuating periodic make and break electric circuit controller, rotatable means for adjusting said controller to operate in various predetermined time periods, an enclosing case, said adjusting means extending externally through said case, limit stop means associated with said rotatable adjusting means to limit the range of adjustment within 360° of rotation, said adjusting means terminating externally in manual adjusting means.

19. In a self-actuating periodic make and break electric circuit controller, means for adjusting said controller to operate in various predetermined time periods, and auxiliary electrical contacting means commonly operable by said time period adjusting means, independently controlling the electric circuit.

20. In a self-actuating periodic make and break electric circuit controller, means for adjusting said controller to operate in various predetermined time periods, and auxiliary contacting means commonly operable by said time period adjusting means and electrically connected in shunt with the actuating electric circuit in said controller.

21. In a self-actuating periodic make and break electric circuit controller, means for adjusting said controller to operate in various predetermined time periods, and auxiliary contacting means commonly operable by said time period adjusting means and disposed to engage at one extreme position of said adjusting means.

22. In a self-actuating period make and break electric circuit controller, means for adjusting said controller to operate in various predetermined time periods, and an auxiliary contacting means operable by said time period adjusting means and disposed to engage at one extreme position of said adjusting means and to remain disengaged at all other positions of said adjusting means.

23. In a self-actuating periodic make and break electric circuit controller, means for adjusting said controller to operate in various predetermined time periods, and an auxiliary contacting means operable by said time period adjusting means and disposed to disengage at one extreme position of said adjusting means and to remain engaged at all other positions of said adjusting means.

24. In a self-actuating periodic make and break electric circuit controller, means for adjusting said controller to operate in various predetermined time periods, and auxiliary contacting means commonly operable by said time period adjusting means for shunting the actuating electric circuit in said controller and disposed to so shunt the controller at one extreme position of said adjusting means.

WILLIAM B. ELMER.

DISCLAIMER 2,182,048.—*William B. Elmer*, Winchester, Mass. ELECTRIC HEAT CONTROLLER. Patent dated Dec. 5, 1939. Disclaimer filed Mar. 13, 1947, by the inventor.
Hereby enters this disclaimer to claim 17 in said specification.
[*Official Gazette April 8, 1947.*]